United States Patent Office 2,906,369
Patented Sept. 29, 1959

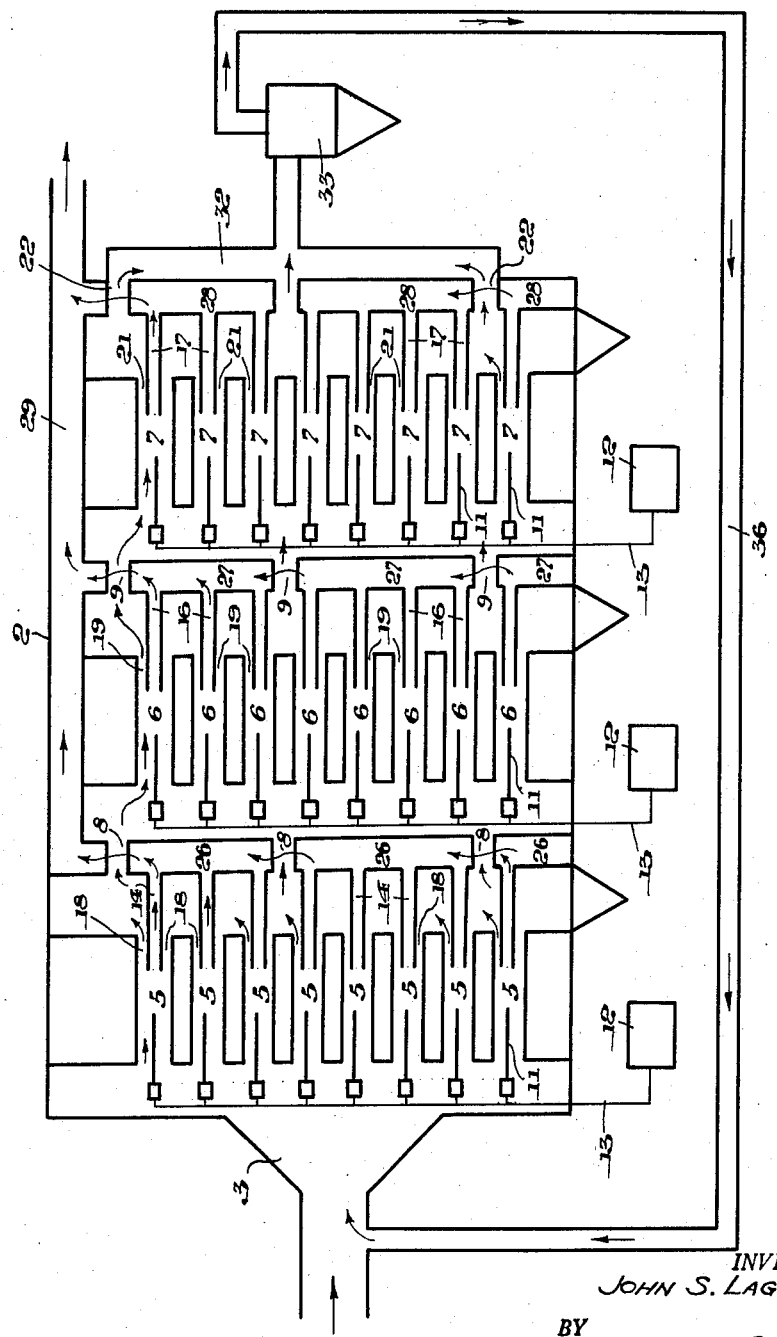

2,906,369

APPARATUS FOR REMOVING PARTICLES FROM FLUID STREAMS

John S. Lagarias, Pittsburgh, Pa., assignor to Koppers Company, Inc., a corporation of Delaware Application October 31, 1956, Serial No. 619,523

7 Claims. (Cl. 183—7)

This invention relates to the separation of solid particles from fluid streams and more particularly to an apparatus for removing waste particles from gaseous fluid streams by means of precipitation.

For a number of years, industrial precipitation units have operated at gas velocities so low that large and bulky units have been required to accommodate the large gas volumes to be passed therethrough. These units, which have included spaced discharge and collecting electrode members, have been expensive to construct and to maintain and have proven difficult to operate at high temperatures. Furthermore, these past units have collected waste particles in such quantities on the collecting electrodes that operation of the units would have been impaired and efficiency reduced from 95% to 60% or even less if the particles had not been removed. Accordingly, rapping of the collecting electrode surfaces at intermittent stages has been required and this, in turn, has necessitated expensive and complex rapping arrangements to accomplish the same. Although this rapping has served to avoid some of the past precipitator problems, it frequently has led to a re-entrainment of a considerable portion of the waste particles back into the gas stream.

To overcome these abovementioned problems, attempts have been made to eliminate rapping mechanism by concentrating the waste particles electrostatically in successive stages, a portion of the waste particles being removed at each stage until the desired particle-free gaseous stream is obtained at a final stage. However, such past practices along this line also have met with difficulty since bulky and expensive equipment has been required to successfully remove the waste particles at each stage and re-entrainment of the waste particles has not been effectively eliminated. Furthermore, past practices have neither recognized, nor solved, the many problems that arise in the electrical separation of both waste particles of low resistivity ($10^4$ ohm centimeters or less) and waste particles of high resistivity ($10^{11}$–$10^{12}$ ohm centimeters or more).

The present invention recognizes and solves problems heretofore not even contemplated, providing a method and apparatus for removing waste particles from gaseous fluid streams which avoid the abovementioned disadvantages and which permit precipitating operations at high gas velocities, high gas pressures, and high gas temperatures through smaller and sturdier precipitation units. The present invention provides for a maximum of waste particle removal with a minimum of waste particle re-entrainment in the gaseous fluid stream through an effective combination of electrical and mechanical precipitation operations. Further, the present invention recognizes that high resistivity waste particles create undesirable "back discharge" in electrical separation, the present invention eliminating such "back discharge" by preventing the high resistivity waste particles from depositing on the walls of precipitators in the area of electrical discharge.

In addition, the present invention recognizes that in past practices low resistivity waste particles in a fluid stream give up their charge in the course of electrical separation and adopt the opposite charge to be reattracted into the stream. This problem is eliminated by concentrating such waste particles away from the stream before they have a chance to lose their charge. In effect, the present invention avoids the problems brought about by both high and low resistivity waste particles by concentrating all of the waste particles in a fluid stream to a small portion of the total stream and selectively withdrawing such small portion for actual removal of the waste particles. Thus, applied electrostatic forces are not required to keep the particles adhering to a collecting surface as has been required in the past.

Various other features of the present invention will become obvious to one skilled in the art upon reading the disclosure set forth hereinafter.

More particularly, the present invention provides a means for removing particles from a fluid stream which comprises structure for flowing such stream through a precipitation zone, dividing the stream while in such zone into a particle-concentrated stream portion and a particle-free stream portion, separating off the particle-free stream portion, and flowing the particle-concentrated stream portion to a further precipitation zone. The present invention also provides apparatus for carrying out this method which comprises a first precipitating chamber having an upstream inlet, a stream dividing means in the chamber to divide the fluid stream into a particle-concentrated fluid portion and a particle-free fluid portion, a particle-free fluid downstream outlet in the first chamber to receive the particle-free fluid portion to be separated off, a particle-concentrated fluid downstream outlet means in the first chamber to receive the particle-concentrated fluid portion and a second precipitating chamber positioned downstream of the first chamber and cooperating with the particle-concentrated downstream outlet of the first chamber to receive the particle-concentrated fluid portion of the stream for further particle precipitation.

It is to be understood that various changes can be made in the arrangement, form, and construction of the several parts of the apparatus disclosed herein without departing from the scope or spirit of this invention.

Referring to the drawing, a schematic arrangement is disclosed of an apparatus which embodies the features of the present invention.

More particularly, there is disclosed a precipitator housing 2 having a main gas inlet 3 therefor. Positioned within the housing are a plurality of end-to-end groups or stages of precipitating chambers 5, 6, and 7. Each of the chambers which are preferably formed from a tube or conduit having a circular cross-section in each stage has an upstream inlet and a downstream outlet, with the upstream inlets of chambers 6 cooperating with the downstream outlets of chambers 5 through gas passages 8, and with the upstream inlets of chambers 7 cooperating with the downstream outlets of chambers 6 through gas passages 9.

Disposed within each of the chambers through the upstream inlet side and extending along the longitudinal axis thereof is a discharge electrode 11, each of the discharge electrodes being connected to a power unit 12 by means of the electrical conduit 13. In this connection, it is to be noted that the insulation material for the discharge electrodes can be positioned away from the precipitator housing, thus further permitting operations of the precipitation unit at higher temperatures than normal. As will be seen hereinafter, the discharge electrodes serve as stream dividing means in each of the chambers, causing the dust particles entering in the inlet side of the chambers to be diverted and concentrated in the stream boundary along the wall of each of the chambers.

Positioned at the outlet side of each of the chambers 5, 6, and 7 are the coaxially disposed conduits 14, 16, and 17 respectively. These conduits are of lesser diameter than the chambers with which they cooperate so as to form respective annular passages 18, 19, and 21. As can be seen in the drawing, the annular passages 18 communicate with the passages 8, annular passages 19 communicate with the passages 9 and annular passages 21 communicate with the downstream outlets 22 of the housing 2. It will be noted that conduits 14, 16, and 17 are connected together in groups by manifold conduits 26, 27, and 28, respectively, these manifold conduits, in turn, each being connected together in a manner not shown so as to communicate with the main header conduit 29 which leads to a stack (not shown). It will be noted further that the outlet conduits 22 are connected by a common conduit 32 which, in turn, leads to a mechanical cyclone type precipitator 33 schematically disclosed. It is to be understood that various types of dust collectors can be used at this point in order to accomplish the results desired. For example, a bag filter type of collector can be used in place of the cyclone precipitator disclosed. Finally, it is to be noted that a reflow conduit 36 is provided, this reflow conduit connecting the outlet of the cyclone precipitator 33 with the gas inlet 3 of the housing 2.

In a typical operation of the present invention, gases are introduced into the precipitator housing 2 through the inlet 3 and thus into the upstream inlet sides of the chambers 5 where the waste particles are concentrated along the stream boundaries by the discharge electrodes 11. The gases can be introduced into the chamber at temperatures as high as 1700° and at velocities ranging from 6 ft./sec. to 80 ft./sec. Advantageously, high velocities in the order of 50 ft./sec. are desirable since the high velocities serve to keep the walls of the precipitating chambers clean. The clean gases enter into the conduits 14, flow through the manifolds 26 and into the main header 29. If desired, spinner arrangements can be provided to cooperate with the chambers 5 and outer walls of conduits 14 to further insure a concentration of the particles along the stream boundaries.

The portions of the streams in which the particles are concentrated flow through the annular passage 18, passages 8, and into the upstream inlets of chambers 6. In chambers 6, the discharge electrodes 11 again divert the particles in the stream along the stream boundaries and the particle-free gases are conducted through the conduits 16, manifolds 27 and into the main stack 29. The particle-concentrated portions of the streams pass through annular conduits 19, passages 9, and subsequently into the upstream inlet portions of the precipitating chambers 7. Once again discharge electrodes 11 concentrate even further the particles along the stream boundaries and the clean gases pass through conduits 17, manifolds 28 and into the main header 29. The heavy particle-concentrated gases then pass through the downstream outlets 22 of the precipitator 2, through the common connecting conduit 32 and into the cyclone mechanical precipitator 33 where a large part of the waste particles are removed. It is to be noted that a mechanical precipitator has been found to be advantageous at this point since such a unit is economical to construct and maintain. Further, such a unit operates more effectively than an electrical unit would with gases of high particle-concentration. Finally, to insure a removal of all of the particles from the gases, the remaining gases are caused to flow back through reflow conduit 36 to inlet opening 3 of precipitator housing 2 for a further waste particle removal treatment.

The invention claimed is:

1. Apparatus for removing particles from a laminar flowing fluid stream comprising a first cylindrical precipitating chamber having a substantially uninterrupted upstream inlet, an ionizing member disposed coaxially within said chamber to divert radially the particles toward the periphery of said stream so as to separate said stream into an annular particle-concentrated fluid portion and an axially substantially particle-free fluid portion, a first fluid downstream outlet axially disposed in said first chamber arranged to receive said substantially particle-free fluid portion, a second downstream annular outlet in said first chamber to receive said annular particle-concentrated fluid portion and a second precipitating chamber positioned downstream of said first chamber and in communication with said second downstream outlet of said first chamber to receive said particle-concentrated fluid portion of said stream.

2. A precipitating apparatus for removing particles from a laminar flowing fluid stream comprising a first cylindrical precipitating chamber having a substantially uninterrupted upstream inlet therein, a stream dividing means in said chamber comprising a coaxially extending ionization member for diverting the particles radially in said laminar flowing stream toward the chamber wall to divide said stream into a particle-concentrated fluid portion and a particle-free fluid portion, downstream outlet means in said first chamber including a conduit disposed coaxially in said outlet means, the inner walls of said conduit forming a first outlet to receive said particle-free fluid portion from said particle-concentrated fluid stream for separating such portion off and the outer wall of said conduit forming with said outlet means an annular second outlet for receiving said particle-concentrated fluid portion, and at least one other cylindrical precipitating chamber positioned downstream of said first chamber and cooperating with said annular second outlet of said first chamber to receive said particle-concentrated fluid portion of said stream.

3. A precipitating apparatus for removing particles from a laminar flowing fluid stream comprising a plurality of end-to-end precipitating chambers of cylindrical cross-section, said chambers each having a substantially uninterrupted upstream inlet and a downstream outlet and being arranged such that the upstream inlet of one chamber cooperates with the downstream outlet of the preceding chamber, a stream dividing means in each of said chambers comprising an ionization member to radially divert the particles in said laminar flowing stream toward the chamber wall thereby to divide said stream into an annular particle-concentrated fluid portion and a cylindrical substantially particle-free fluid portion, a conduit disposed coaxially in each of said downstream outlets preceding an upstream outlet of an adjacent chamber, the inner walls of said conduit forming a first cylindrical outlet to receive said particle-free fluid portion to separate such portion off and the outer wall of said conduit forming with said outlet means an annular second outlet to receive said particle-concentrated fluid portion, said annular second outlet communicating with the upstream inlet of the adjacent end-to-end chamber whereby particle-concentrated fluid portions are passed from one precipitating chamber to the next.

4. The apparatus of claim 3, and a mechanical type dust separator positioned adjacent the last downstream outlet to receive said particle-concentrated fluid and separate the concentrated particles therefrom.

5. The apparatus of claim 4, and reflow means between said mechanical separator and the upstream inlet of the first of said precipitating chambers.

6. The invention as defined in claim 5 in which said apparatus includes a first manifold connected to said conduit for collecting the substantially particle free portion from the precipitating chamber.

7. A precipitating apparatus for removing particles from a fluid stream comprising: a plurality of side-by-side precipitating chambers, each of said precipitating chambers comprising a cylindrical tube of uniform cross section along its length and having a substantially open and uninterrupted upstream inlet and a downstream outlet, and electrode mounted coaxially within said chamber for ionizing and radially diverting said particles in said stream toward the chamber wall so as to divide said stream into an annular particle-concentrated fluid portion and a central particle-free portion, a conduit disposed coaxially into said downstream outlet for receiving said central particle-free portion and forming an annular passage between the inner wall of said tube and the outer wall of said conduit for receiving said annular particle-concentrated fluid portion; a common fluid conducting main connected to the upstream inlet of each of said chambers; a first manifold connected to each of said conduits for receiving said substantially free fluid portion; and a second manifold connected to each of said annular passages for receiving said particle-concentrated fluid portion.

References Cited in the file of this patent

UNITED STATES PATENTS

| | | |
|---|---|---|
| 1,372,710 | McGee et al. | Mar. 29, 1921 |
| 2,061,045 | Ruder et al. | Nov. 17, 1936 |
| 2,748,888 | Hodson | June 5, 1956 |
| 2,776,725 | Wood | Jan. 8, 1957 |

FOREIGN PATENTS

| | | |
|---|---|---|
| 314,171 | Germany | Sept. 2, 1919 |
| 878,636 | Germany | June 5, 1953 |
| 699,670 | Great Britain | Nov. 11, 1953 |